(12) United States Patent
Bhathija et al.

(10) Patent No.: US 8,163,998 B2
(45) Date of Patent: Apr. 24, 2012

(54) ELECTRICAL BUSWAY FLANGE END STUB

(75) Inventors: Kuldeep Kumar Bhathija, Hyderabad (IN); Jeffery Lynn Cox, Selmer, TN (US); Steven English Richard, Selmer, TN (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 12/208,680

(22) Filed: Sep. 11, 2008

(65) Prior Publication Data

US 2010/0059276 A1    Mar. 11, 2010

(51) Int. Cl.
*H02G 5/00* (2006.01)
(52) U.S. Cl. .......... 174/99 B; 174/72 B; 174/71 B; 174/68.2; 361/675; 361/611; 361/637
(58) Field of Classification Search .......... 174/137 R, 174/72 B, 71 B, 88 B, 70 B, 99 B, 129 B, 174/133 B, 149 B, 68.2; 439/212, 213, 114; 361/675, 611, 637, 648
See application file for complete search history.

(56) References Cited

U.S. PATENT DOCUMENTS

| | | | | | |
|---|---|---|---|---|---|
| 3,365,537 | A | * | 1/1968 | Fehr, Jr. et al. | 174/88 B |
| 3,609,215 | A | * | 9/1971 | Giger et al. | 174/88 B |
| 3,639,676 | A | * | 2/1972 | Dempsey et al. | 174/99 B |
| 3,647,937 | A | * | 3/1972 | Jorgensen | 174/88 B |
| 4,008,365 | A | * | 2/1977 | Carlson | 174/68.2 |
| 4,112,249 | A | * | 9/1978 | Carlson | 174/68.2 |
| 4,213,003 | A | * | 7/1980 | Carlson | 174/88 B |
| 4,950,841 | A | * | 8/1990 | Walker et al. | 174/88 B |
| 5,401,906 | A | * | 3/1995 | Bryant | 174/88 B |
| 6,329,598 | B1 | * | 12/2001 | M'Sadoques et al. | 174/68.2 |
| 7,830,648 | B2 | * | 11/2010 | Strong et al. | 361/624 |

* cited by examiner

*Primary Examiner* — Angel R Estrada
(74) *Attorney, Agent, or Firm* — Cantor Colburn LLP

(57) ABSTRACT

A flange end stub for an electrical busway system is provided. The flange end stub includes a flange plate having a first and second tab extending perpendicular to a first surface. A pair of joint side plates is coupled to the first and second tab with one or more conductors extending through the flange plate in between the joint side plates. A first and second bracket is coupled in between the joint side plates on either side of the conductors. Covers are mounted to the first and second brackets and extend over the conductors and any joint assembly that is attached. The covers and brackets cooperate to provide ingress protection.

20 Claims, 3 Drawing Sheets

ELECTRICAL BUSWAY FLANGE END STUB

BACKGROUND

The present invention relates to an electrical busway system, and particularly relates to a system for coupling an electrical busway to equipment using a flange end stub connector.

Electrical busway, also known as elongated electrical distribution busway, is well known in the art. An electrical busway housing system is typically comprised of multiple pieces of tract connected end to end with one or more electrically-isolated, conductive busbars fastened to the housing, such that the system is capable of conducting electricity end to end through the busbars. The busbar is also adapted to permit electrical power tap-off at any point along the length of the busbar. Such busbars are often provided overhead, or may be provided along walls or flooring, and are used to distribute electricity through various take-off devices to equipment, appliances, lighting or other articles requiring a source of electrical energy to operate. For example, when installed in a home or office setting, it is often used to permit lighting and/or electrical sockets to be placed in one or more locations along the electrical busway. When installed in a factory or other industrial application, electrical sockets, lighting or other industrial devices may be placed on, near or along the busway to obtain electrical current from the busway.

Sections of the busway track can be joined together to form long runs for the power distribution, and such sections may be of any length, but are generally anywhere from two to twenty feet long each. The joining of two twenty foot sections to one another, for example, provides forty feet of electrical busbar, and the process can be repeated as necessary to provide electrical busway of substantial length.

Busway is also connected to equipment such as a switchboard or switchgear for example. These connections usually use an intermediate coupling called a flange end stub. Flange end stubs are designed to allow the busbar to be connected to a variety of different equipment. These connections typically utilize an extruded aluminum housing that uses external bolts through a flange to secure the housings to a flange. The aluminum housing has a joint assembly at one end that connects to a first busway, and a bolted connection on the opposite end that coupled to the flange. Unfortunately, the extruded aluminum housing is costly and results in increases the amount of scrap material.

Accordingly, while present busway connection systems are suitable for their intended purposes, there is a need in the art for a system of coupling busways in a more cost efficient manner.

BRIEF DESCRIPTION OF THE INVENTION

A flange end stub for an electrical busway coupling is provided. The flange end stub includes a flange having a planar portion and a first tab extending generally perpendicular to the planar portion. An electrical conductor extends through the center of the flange. A first joint side plate is coupled to the first tab by a first pair of fasteners. A first bracket is coupled to the first joint side plate adjacent the conductor. A first insulative cover is coupled to the first bracket.

Another flange end stub for an electrical busway coupling is also provided. The flange end stub includes a first flange plate having a first surface and a first tab extending substantially perpendicular to the first surface. A second flange plate having a second surface and a second tab extending substantially perpendicular to the second surface is arranged in substantially the same plane as the first surface. A first joint side plate is coupled to the first tab. A second joint side plate is coupled to the second tab. A conductor extends between the first flange plate and the second flange plate. A fastener couples the first tab, the first joint side plate, the conductor, the second joint side plate and the second tab.

A busway system is provided having a housing with a busbar disposed therein. A joint assembly having a splice plate is electrically coupled to the busbar. A stub end connector assembly is coupled to the joint assembly. The stub end connector assembly includes a flange having a planar portion arranged substantially perpendicular to the busway. The flange includes a first tab and second tab extending substantially perpendicular to the planar portion. A conductor extends through the planar portion, the conductor being directly coupled to the splice plate. A first joint side plate is coupled to the first tab. A second joint side plate is coupled to the second tab.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
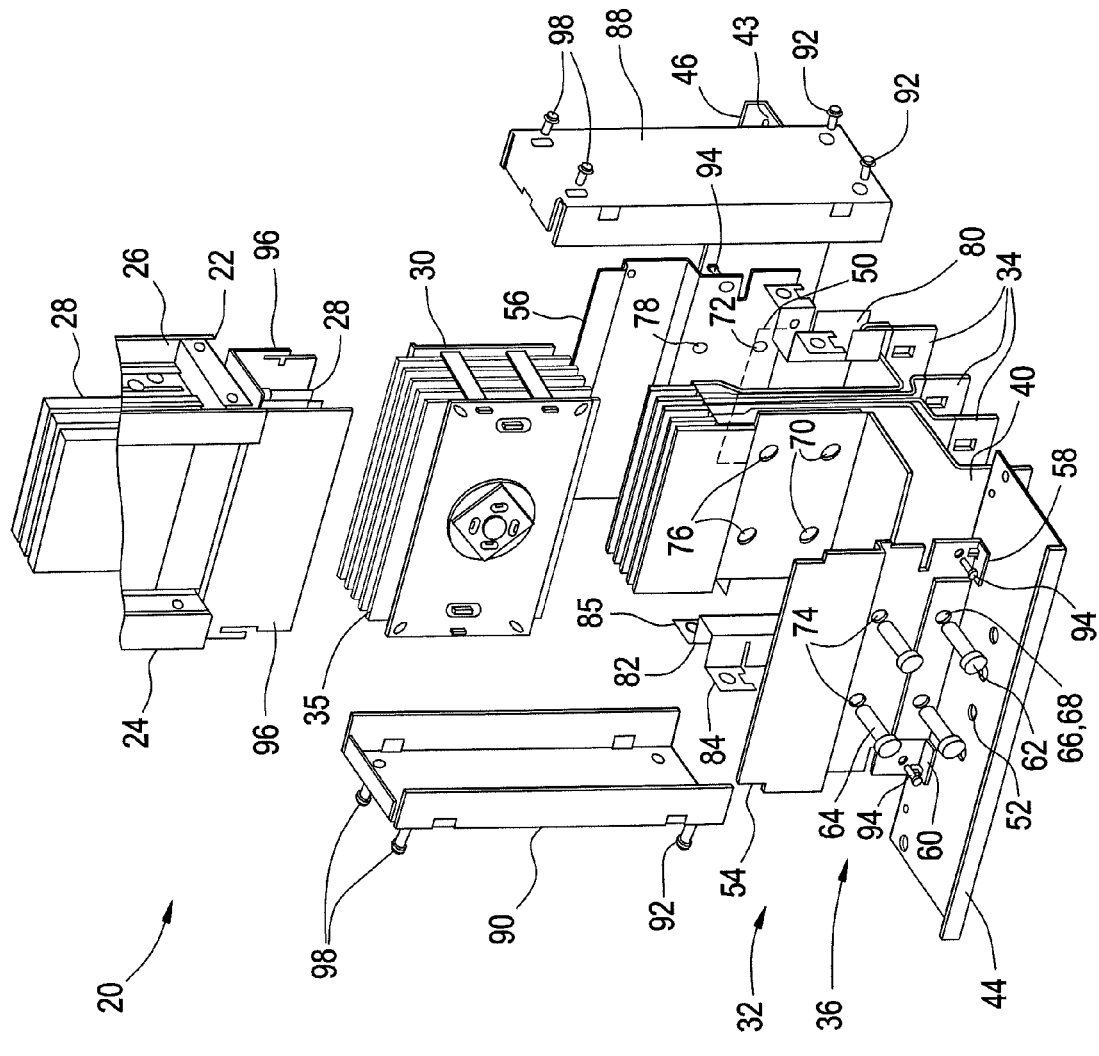
FIG. 1 is an exploded view illustration of a flange end stub connector in accordance with an exemplary embodiment.

Busway systems 20 are used to transfer power within an electrical distribution system. The busway 20 typically includes a housing 22 made from extruded aluminum, but may employ other materials suitable for the purposes disclosed herein. The housing 22 is formed by interlocking a first half 24 with a second half 26. The housing 22 contains a plurality of busbars 28, where each of the busbars 28 carries a separate electrical phase. It should be appreciated that each of the individual busbars 28 is insulated from the other busbars 28. Busway 20 are formed in standard lengths, such as 20 feet for example, and may be interconnected with other busway by joint assemblies 30. Busway 20 may be further connected with members having other shapes to allow the routing of the busway 20 within an electrical distribution system. Busbars 28 are typically made from copper, but may be made from any other material suitable for the purposes disclosed herein, such as aluminum or copper-clad aluminum for example.

At certain locations within the electrical distribution system, it is desirable to couple the busway 20 to electrical distribution equipment (not shown), such as switchgear or a switchboard for example. This distribution equipment allows the transfer of electrical power from the busway 20 to downstream loads or other sub-circuits that utilize the electrical power. To adapt the busway 20 to the distribution equipment, a flange end stub connector 32 is used.

A joint assembly 30, electrically couples the busbar 28 in busway 20 to stub conductors 34 in flange end stub connector assembly 32. The joint assembly 30 is coupled to the busbars 28 and stub conductors 34 using splice plates 35 as is known in the art. The stub conductors 34 extend through a flange plate 36 and terminate in connector portion 38. The connector portion 38 provides a convenient coupling location for electrically connecting the stub end connector to the desired distribution equipment. Similar to the busbars 28, the individual stub conductors 34 include an insulation covering 40 that electrically insulates the individual phases from each other and from other electrically conductive components.

The flange plate 36 includes a planar surface 42 that is substantially perpendicular to the longitudinal direction of the busway 20. The flange plate 36 is formed from a first portion 44 and a second portion 46. Each portion 44, 46 have a tab 48, 50 and a planar surface 42, 43 respectively. The tabs 48, 50 extend from the planar surfaces 42, 43 and are substantially perpendicular to the planar surfaces 42, 43. The flange plate 36 may also include other features, such as mounting holes 52 assist in attaching the flange plate 36 to the distribution equipment.

Coupled to the tabs 48, 50 are a pair of joint side plates 54, 56 arranged on opposite sides of the stub conductors 34 respectively. As will be discussed in more detail below, the joint side plates 54, 56 act as a heat sink that draws thermal energy generated by the current passing through the stub conductors 34. A first pair of double insulated bolts 62 extend through holes 66 in tab 48 and holes 68 in joint side plate 54, then through corresponding holes 70 in stub conductors 34 and holes 72 in joint side plate 56. The insulated bolts 62 then extend through holes in tab 50 where they are retained by fasteners. Similarly, a second pair of double insulated bolts 64 extend through a second set of holes 74 in joint side plate 56, holes 76 in stub conductors 34 and holes 78 in joint side plate 56. Similar to bolts 62, the bolts 64 are retained by fasteners. The bolts 62, 64 mechanically fasten the stub conductors 34 to joint side plates 54, 56.

The joint side plates 54, 56 each further include a pair of projections 58, 60 that contact that planar surface 42 and are arranged on either side of the tabs 48, 50. These projections provide a locating feature that aids in the assembly of the flanges 36 and conductors 38 while the bolts 62, 64 are tightened.

Figure 2:
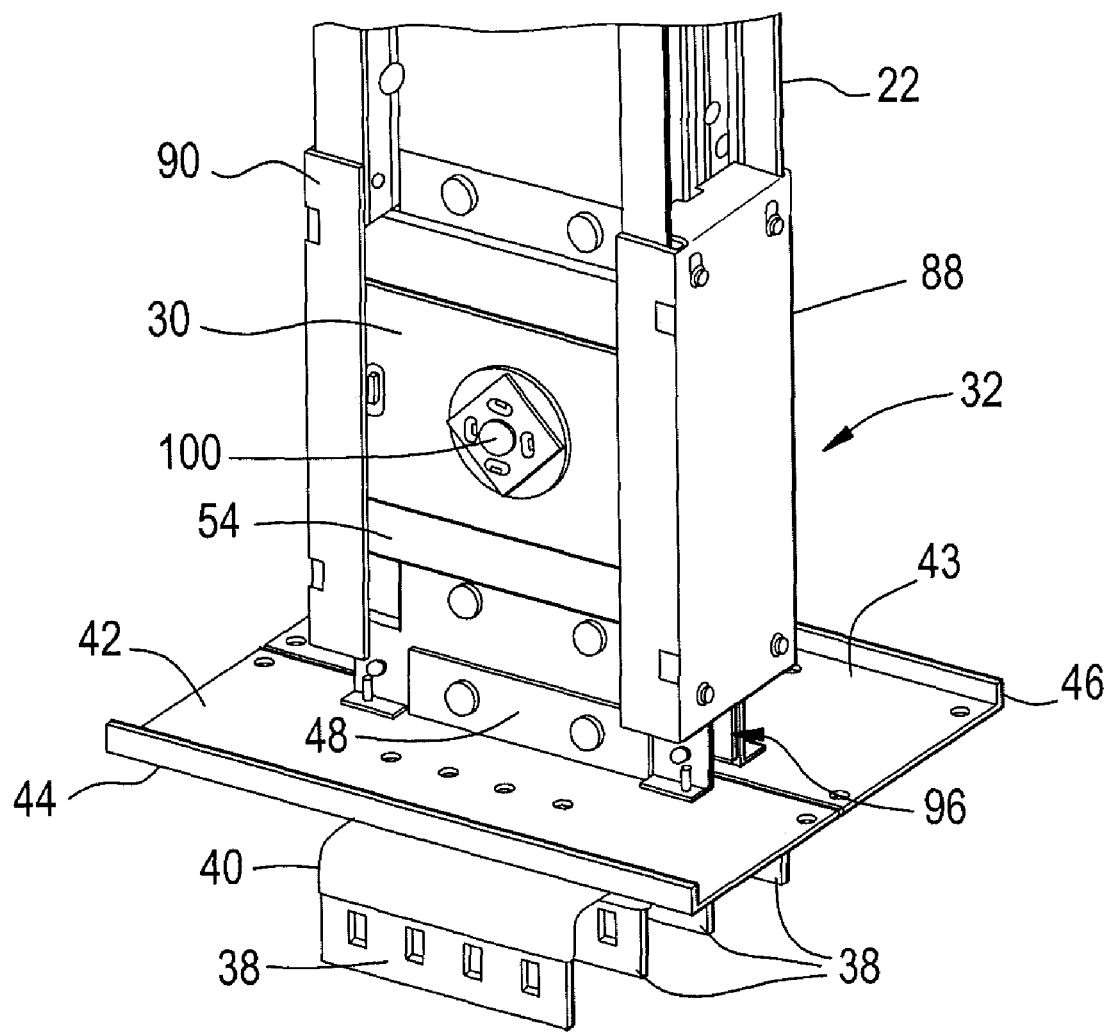
FIG. 2 is a perspective view illustration of an assembled flange end stub connector of FIG. 1; and, FIG. 3 is a perspective view illustration of the flange end stub connector of FIG. 2 with the covers removed.
Figure 3:
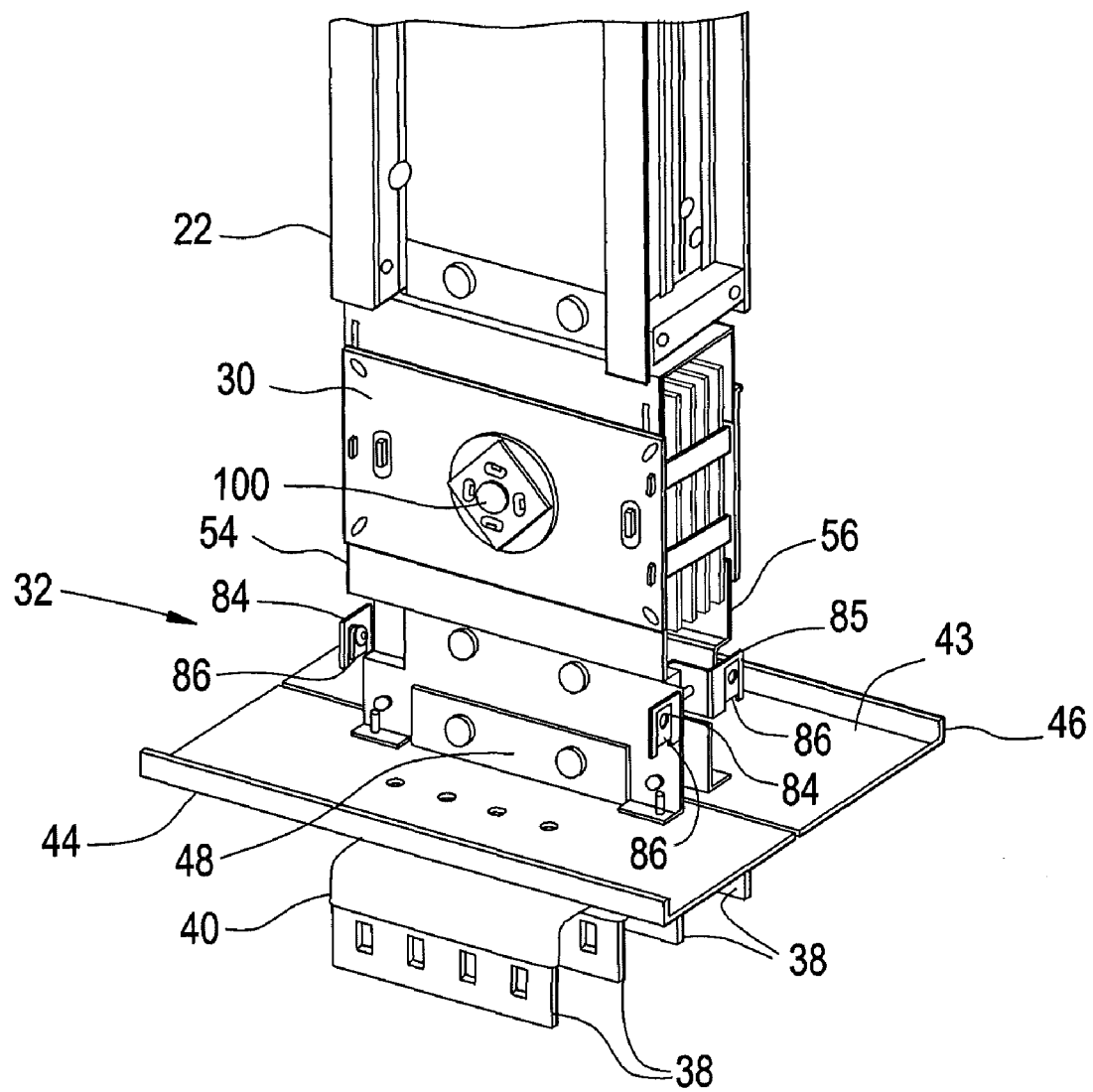

The flange end stub connector 32 also includes brackets 80, 82 that are arranged in-between the joint sides 54, 56. Bolts 94 extend through the joint side plates 54, 56 to retain the brackets 80, 82. The brackets 80, 82 include a pair of projections 84, 85 that receive fasteners 86 (FIG. 3) that receive bolts 92 and couple the covers 88, 90 to the flange end stub connector 32. The brackets 80, 82 also provide additional functionality in covering access to the stub conductors 34 in the gap 96 (FIG. 2) between the covers 88, 90 and the flange plate 36. This provides advantages in meeting ingress protection (IP) standards, such that defined by IEC 60529.

The covers 88, 90 provide further ingress protection and span across the stub end connector 32, the joint assembly 30 and the brackets 96 on the end of the busway 20. In addition to being retained to the brackets 80, 82, the covers 88, 90 are fastened to the busway housing 22 by bolts 98. Once installed, the combination of the covers 88, 90 and the brackets 80, 82 block direct access to electrically live conductors in the assembly sufficient to meet or exceed ingress protection standards, such as IP40.

When used in an application, the flange end stub connector 32 is coupled to the desired equipment (not shown), such as switchgear for example. It should be appreciated that the flange end stub connector 32 is typically received for installation in an assembled state, meaning that the flange plate 36, the joint side plates 54, 56, the brackets 80, 82 and the stub conductors 34 are fastened together as an assembly as described above. The stub conductors 34 are mechanically fastened to corresponding conductors in the desired equipment. If needed additional fasteners may couple the flange plate 36 to the equipment, such as through holes 52 for example.

The joint assembly 30 is slid onto the flange end stub conductors 32 and the busbar 28 is slid into the joint assembly 30. This creates an electrical connection between the busbars 28 and the stub conductors 34. The installation personnel then tighten bolt 100 on joint assembly 30 to secure the busway 20 and the stub conductors 34 to the splice plates 35 as is known in the art. Finally, covers 88, 90 are fastened to the brackets 80, 82 and the busway housing 22 to provide ingress protection.

During operation, electrical power is transferred from the busway 20 to the downstream equipment via the stub end connector assembly 32. The transfer of electrical power inherently results in the generation of thermal energy due to the resistance of the conductors. The stub end connector assembly 32 is arranged such that the joint side plates 54, 56 are thermally coupled to absorb heat generated by the stub conductors 34. This thermal energy is then transferred by the joint side plates 54, 56 to the environment to keep the stub conductors 34 within desirable temperature ranges, such as those defined by Underwriters Laboratories (UL) standard 857.

It should be appreciated that the flange end stub connector 32 provides advantages in the manufacture and assembly. The flange end stub connector 32 may eliminate the need for non-standard extrusions, which avoids scrap and inefficient use of materials. The components used within the flange end stub connector 32 are fabricated by well-known and cost effective techniques such as progressive die stamping for example. The flange end stub connector 32 provides further advantages in that it may be modified to accommodate different equipment while using common parts such as the covers 88, 90 and insulated bolts 62, 64 for example.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A flange end stub for an electrical busway coupling, comprising:
   a flange having a planar portion and a first tab extending generally perpendicular to said planar portion;
   an electrical conductor extending through the planar portion of said flange;

a first joint side plate coupled to said first tab by a first pair of fasteners;
a first bracket coupled to said first joint side plate adjacent said conductor; and,
a first insulative cover coupled to said first bracket.

2. The flange end stub of claim 1 wherein said flange has a second tab extending substantially perpendicular to said planar portion, wherein said second tab is substantially parallel to said first tab.

3. The flange end stub of claim 2 further comprising:
a second joint side plate coupled to said second tab by said first pair of fasteners;
a second bracket coupled between said first joint side plate and said second joint side plate; and,
a second insulative cover coupled to said second bracket.

4. The flange end stub of claim 3 further comprising a first projection and a second projection extending from one end of said first bracket, wherein said first projection and said second projection extend generally perpendicular to the planar portion of said flange, said first projection and said second projection being coupled to said first insulative cover.

5. The flange end stub of claim 4 further comprising a third projection and a fourth projection extending from one end of said second bracket, wherein said third projection and said fourth projection extend generally perpendicular to the planar portion of said flange, said third projection and said fourth projection being coupled to said second insulative cover.

6. The flange end stub of claim 5 further comprising a second pair of fasteners coupling said first bracket to said first joint side plate and said second joint side plate.

7. The flange end stub of claim 6 further comprising a third pair of fasteners coupling said second bracket to said first joint side plate and said second joint side plate.

8. The flange end stub of claim 7 wherein said first pair of fasteners are insulated bolts.

9. The flange end stub of claim 8 further comprising a fourth pair of fasteners coupling said first joint said plate, said second joint side plate and said conductor.

10. A flange end stub for an electrical busway coupling comprising:
a first flange plate having a first surface and a first tab extending substantially perpendicular to said first surface;
a second flange plate having a second surface and a second tab extending substantially perpendicular to said second surface, wherein said second surface is arranged in substantially the same plane as said first surface;
a first joint side plate coupled to said first tab;
a second joint side plate coupled to said second tab;
a conductor extending between said first flange plate and said second flange plate; and,
a fastener coupling said first tab, said first joint side plate, said conductor, said second joint side plate and said second tab.

11. The flange end stub of claim 10 further comprising:
a first bracket coupled between said first joint side plate and said second joint side plate; and,
a second bracket coupled between said first joint side plate and said second joint side plate.

12. The flange end stub of claim 11 wherein:
said first bracket is in contact with said first surface and said second surface; and,
said second bracket is in contact with said first surface and said second surface.

13. The flange end stub of claim 12 further comprising:
a first cover coupled to said first bracket; and
a second cover coupled to said second bracket.

14. A busway system comprising:
a busway having a housing with a busbar disposed therein;
a joint assembly having a splice plate electrically coupled to said busbar;
a stub end connector assembly coupled to said joint assembly, wherein said stub end connector assembly comprises:
a flange having a planar portion arranged substantially perpendicular to said busway, said flange includes a first tab and second tab extending substantially perpendicular to said planar portion;
a conductor extending through said planar portion, said conductor being directly coupled to said splice plate;
a first joint side plate coupled to said first tab; and,
a second joint side plate coupled to said second tab.

15. The busway system of claim 14 wherein said stub end connector assembly further comprises:
a first bracket coupled between said first joint side plate and said second joint side plate, said first bracket being in contact with said planar portion; and,
a second bracket coupled between said first joint side plate and said second joint side plate, said second bracket being in contact with said planar portion.

16. The busway system of claim 15 wherein:
said first bracket includes a first projection adjacent said first joint side plate and a second projection adjacent said second joint side plate, said first projection and said second projection are arranged to extend substantially perpendicular to said first joint side plate; and
said second bracket includes a third projection adjacent said first joint side plate and a fourth projection adjacent said second joint side plate, said third projection and said fourth projection being arranged to extend substantially perpendicular to said first joint side plate.

17. The busway system of claim 16 further comprising:
a first cover coupled to said first bracket and said housing; and,
a second cover coupled to said second bracket and said housing.

18. The busway system of claim 17 wherein:
said first cover is coupled to said first projection and said second projection; and,
said second cover is coupled to said third projection and said fourth projection.

19. The busway system of claim 18 further comprising a first pair of fasteners coupling said first tab to said second tab.

20. The busway system of claim 19 further comprising a second pair of fasteners coupling said first joint side plate, said conductor and said second joint side plate.

* * * * *